United States Patent [19]

Correa

[11] 4,353,442
[45] Oct. 12, 1982

[54] BRAKE SHOE AND BRAKE ASSEMBLY FOR AUTOMOTIVE VEHICLES

[75] Inventor: Flavio D. Correa, Campinas, Brazil

[73] Assignee: Bendix do Brasil Equipamentos Para Autoveiculos LTDA., Campinas, Brazil

[21] Appl. No.: 85,086

[22] Filed: Oct. 15, 1979

[51] Int. Cl.$^3$ .............................................. F16D 65/09
[52] U.S. Cl. ............................. 188/330; 188/206 A; 188/250 F; 188/335; 188/341
[58] Field of Search ............... 188/341, 206 A, 250 F, 188/327, 328, 329, 330, 250 A, 250 E, 250 G, 335, 334, 333, 340, 250 C, 250 H, 18 R, 18 A

[56] References Cited

U.S. PATENT DOCUMENTS

| 3,677,376 | 7/1972 | Barajas | 188/341 |
| 4,157,747 | 6/1979 | Getz et al. | 188/341 |
| 4,206,834 | 6/1980 | Williams | 188/341 |

FOREIGN PATENT DOCUMENTS

| 698577 | 11/1940 | Fed. Rep. of Germany . |
| 568658 | 12/1923 | France . |
| 831091 | 5/1938 | France . |
| 534591 | 3/1941 | United Kingdom . |

Primary Examiner—Douglas C. Butler
Attorney, Agent, or Firm—Ken C. Decker; W. N. Antonis

[57] ABSTRACT

The present invention relates to a brake shoe and brake assembly for automotive vehicles, comprising a pair of brake shoes (14) having ends pivotably mounted on a brake spider (12), and a actuator cam (26) located between the opposite ends of the brake shoes (14). The webs (24) of brake shoes (14) have adequate apertures in the pivoting ends, to engage rotational anchor pins (16). The apertures have radial sections and lateral flats to engage radial sections and lateral flats in the ends of the anchor pins (16). The apertures form slidable, but not rotational, connections with anchor pins (16), to support brake shoes (14), and allow a pivoting movement of brake shoes (14), through anchor pins (16), when an application and release of the brake is effected. The aperture is directed in such a way in respect to a line that passes through the centers of the brake assembly and of the rotational pin (16), that the end of the brake shoe forms a hook preventing the end of the shoe, having the aperture from being moved away from the anchor pin (16), whenever a brake application is effected.

8 Claims, 4 Drawing Figures

BRAKE SHOE AND BRAKE ASSEMBLY FOR AUTOMOTIVE VEHICLES

This invention relates to an improvement for automotive vehicle brakes consisting of a brake spider, on which is mounted a pair of brake shoes, pivotably mounted on one of its ends and actuated by a rotatable cam, disposed between the opposite brake shoes ends. The cam rotation will cause a pivoting movement of each shoe around its respective anchor pin, moving them away from the brake assembly center, to force them into engagement with the internal friction face of the brake drum. The shoes employed in this type of brake are fabricated or cast with one or two webs, as required, and according to the characteristics of the vehicle where said shoes will be used.

In the end of the shoe, actuated by a cam, a cam follower roller is mounted. The opposite end of said shoe is mounted on an anchor pin. There are two anchor pins, one for each shoe.

In the present state of the art, the shoes are mounted by inserting an anchor pin through a hole located in the brake spider and hole(s) provided in the web(s) of each shoe. Normally, pins and shoes are hold in place by snap rings at the ends of the anchor pins, thus, preventing any displacement of either shoes or pins, except for the pivoting movement of the shoes, necessary to obtain the braking action of the brake assembly.

The above described system presents some disadvantages, well known to those skilled in the art. The main disadvantages being is the difficulty to remove the anchor pin when friction material needs to be changed (brake lining) or when the shoe should be replaced. Due to vehicle usage, and environmental conditions, it is impossible to prevent penetration of humidity and/or contaminants in the bearing area between the anchor pin and the anchor pin hole, and said contamination and/or humidity often causes seizing and corrosion of the pins creating difficulty in removal in order to remove said shoe. Sometimes seizing and corrosion are so bad that the user is compelled to change the entire brake assembly.

This invention presents a brake shoe, with one or two webs, having, in the end opposite to that actuated by the cam, an aperture slidably engaging the anchor pin. In one option, said pin has, on both ends, lateral flats parallel to each other and equidistant from the center of said pin.

The web(s) of said shoe present(s) a U-Shaped aperture having a radial section, which abuts the radial section of the pin, between two lateral and parallel flats that intersect with the radius of the radial section and that, in the assembled brake, engage with the lateral flats of the anchor pin.

The two parallel flats of the aperture in the end of said shoe are directed in such a way in the web, that, when said shoes are mounted, said parallel flats will form an angle with a line passing through the anchor pin center and brake assembly center. The purpose of this angle is to prevent, that during a brake application, when by a tangential force one shoe is urged into engagement with its anchor pin, and the other shoe tends to move away from its respective anchor pin, said angle maintains the parallel flats in a position, such, that then will form a gripping hook, which prevents that said shoe moves away or disengages from the anchor pin.

In another option of this invention the pin has one lateral flat on each end, both flats to be in the same plane. The shoe web(s) show(s) an aperture substantially semi-circular, having a radial section which engages the radial section of the anchor pin and a flat, that intersects with the radius of said radial section, and that, in the brake assembly engages said lateral flat of said anchor pin. The lateral flat of said aperture in the end of said shoe is directed in a such a way in the web, that, when said shoes are mounted, said lateral flat will form an angle with a line that passes through the center of the anchor pin and the center of the brake assembly. The purpose of this angle is to prevent, that during a brake application, when by a tangential force said shoe is urged into engagement with an anchor pin and the other shoe tends to move away from the anchor pin, said angle sets the lateral plane in such position, that it will form a gripping hook which prevents said shoe from moving away from the anchor pin.

One of the advantages of the shoe constructed as described herein is that, whenever necessary, said shoes may be removed within any problem or aid of special tools.

Still another advantage of said shoes constructed as described herein is that there is no rotational movement of the shoe web(s) on the anchor pins. Thus, wear of shoe web(s) will be avoided.

DETAILED DESCRIPTION

Figure 1:
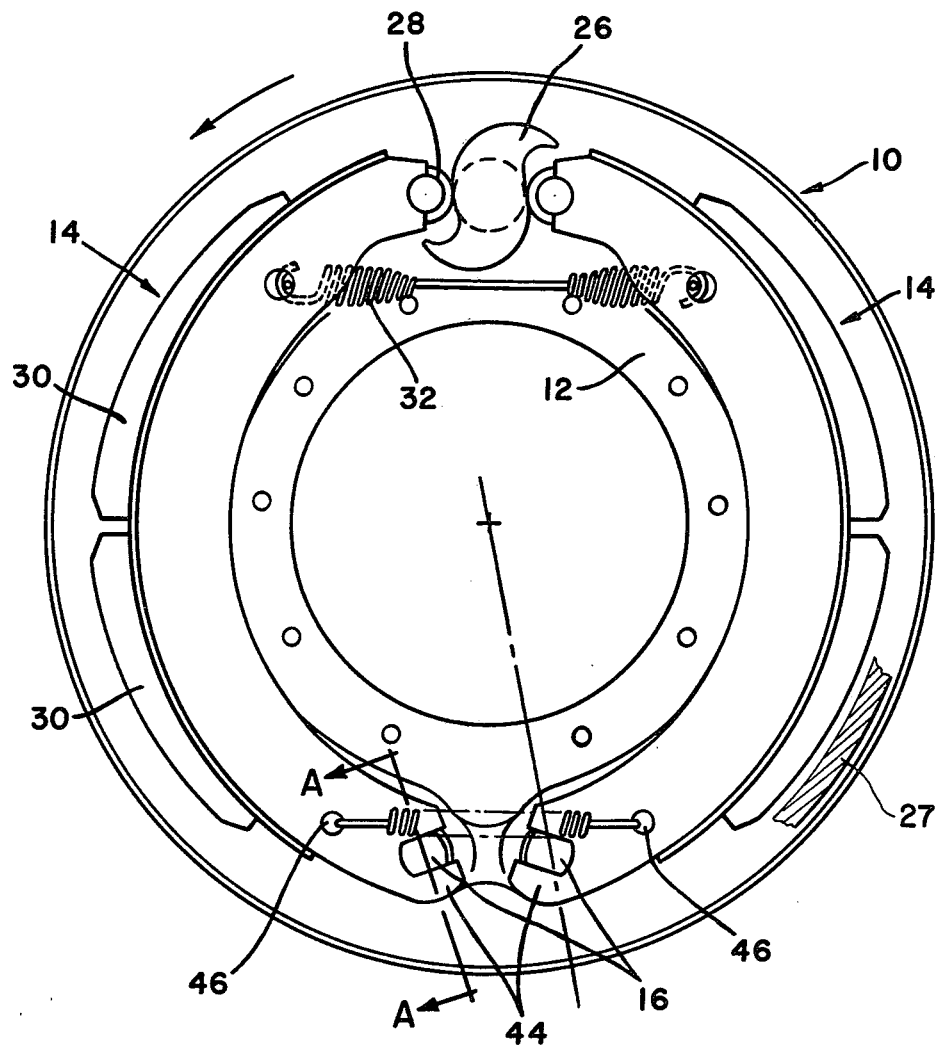
FIG. 1 is a front view of the brake assembly, pursuant to the present invention.

Referring now to the drawings, a brake assembly, actuated by a cam is indicated by the numeral 10. The assembly 10 is supported by the brake spider or support member 12, which is rigidly fastened to the vehicle axle flange (not shown).

Figure 3:
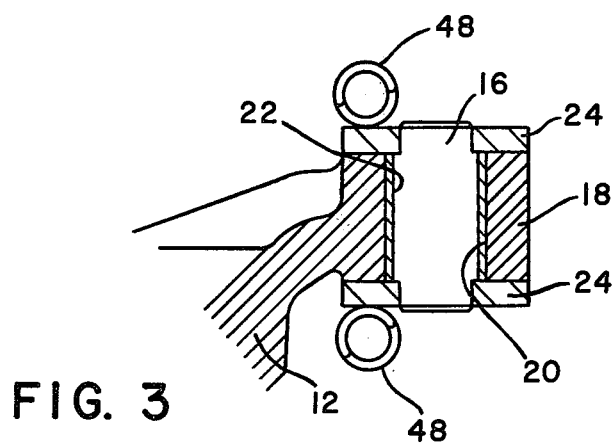
FIG. 3 is a view of a section cut along line A—A of FIG. 1.

The brake assembly 10 includes a pair of brake shoes 14 rotationally mounted by one end on an anchor pin 16, which in turn is mounted in the brake spider 12. Anchor pins 16 are individually mounted in cylindrical holes 20 in hubs 18, where guide bushings 22 are pressed in, which rotatably receive anchor pins 16; the assembly is clearer in FIG. 3. Hubs 18 are integral parts of the brake spider 12, and are axially off-set so as to support a pair of webs 24 of the brake shoes 14.

Between the brake shoe ends 14, opposite to the anchor pin 16, there is a cam 26, having a rotary movement. Each brake shoe 14 is provided with a roller 28, which functions as a follower of cam 26. The cam 26 is rotated by means that are not shown in the drawings but are well known to those skilled in the art. When brake 10 is applied, cam 26 rotates, urging the shoes 14 outward into engagement with a rotating brake drum 27 by means of rollers 28. The shoes are pivoted around the center of bushings 22, by means of anchor pins 16. This displacement expanding the brakes shoes 14, forces the brake lining 30 into engagement with the internal face of the brake drum (not shown) fastened to the wheel of vehicle.

When the brake 10 is released, the brake shoe 14, and brake lining 30, fastened to the brake shoe 14, move away from the internal surface of the brake drum by action of a return spring 32, held conveniently between the webs of the two shoes.

In the end opposite to follower 28, of cam 26, each shoe web 24, shows a U-Shaped aperture 34, formed by a radial section 36, and two parallel flats 38, which intersect with the radius of said radial section.

Figure 2:
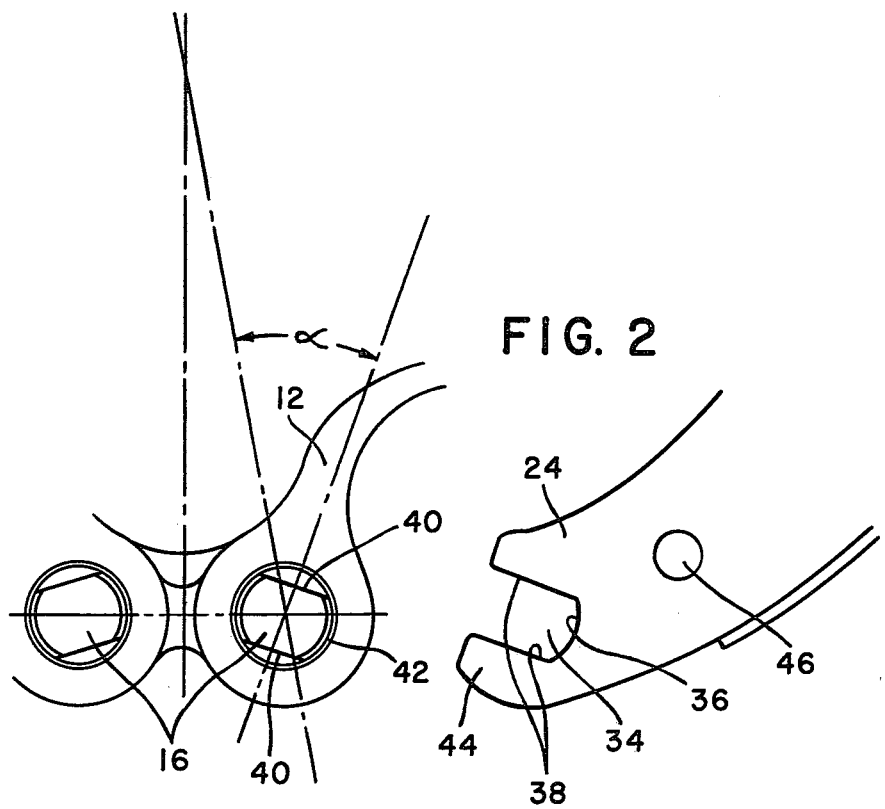
FIG. 2 is a view of the lower part of the brake spider, with one end of the shoe showing the U-Shaped aperture.

Anchor pins 16, in turn, have on both ends two parallel flats 40, to engage with parallel flats 38, of aperture 34 of brake shoes 14, while the radial section 36 of aperture 34, engages radial section 42 on both ends of anchor pin 16. Aperture 34 is oriented in such a way in shoe end 14, that, when mounted in brake assembly 10, the plane perpendicular to the parallel flats 38, of aperture 34 will form an angle varying between 10° and 40° in relation to a line that passes through the centers of brake assembly 10 and of anchor pin 16, as illustrated in FIG. 2. This angle causes end 44, to act as a hook that holds shoe 14, in contact with anchor pin 16, preventing shoe 14 from being separated from anchor pin 16, when, during a brake application, the friction developed between the brake linings 30 and the internal surface of the brake drum generates a tangential force that tends to separate the brake shoe 14, from anchor pin 16. It should be understood that, when a wheel and brake drum rotate counter-clockwise, as indicated by the arrow of FIG. 1, this hook action occurs with shoe 14, shown at the right in FIG. 1. Should the wheel rotate clockwise, then this action occurs with the shoe shown at the left in FIG. 1.

Bushings 22 are pressed in the holes 20 of hubs 18, of brake spider 12. The anchor pins 16 are mounted slidably in the bushings 22, so as to allow a free rotary movement. Webs 24 of brake shoes 14, close to apertures 34, show holes 46, where springs 48 are hooked, which hold the radial sections 36 of apertures 34, in contact with radial sections 42 of anchor pins 16.

Figure 4:
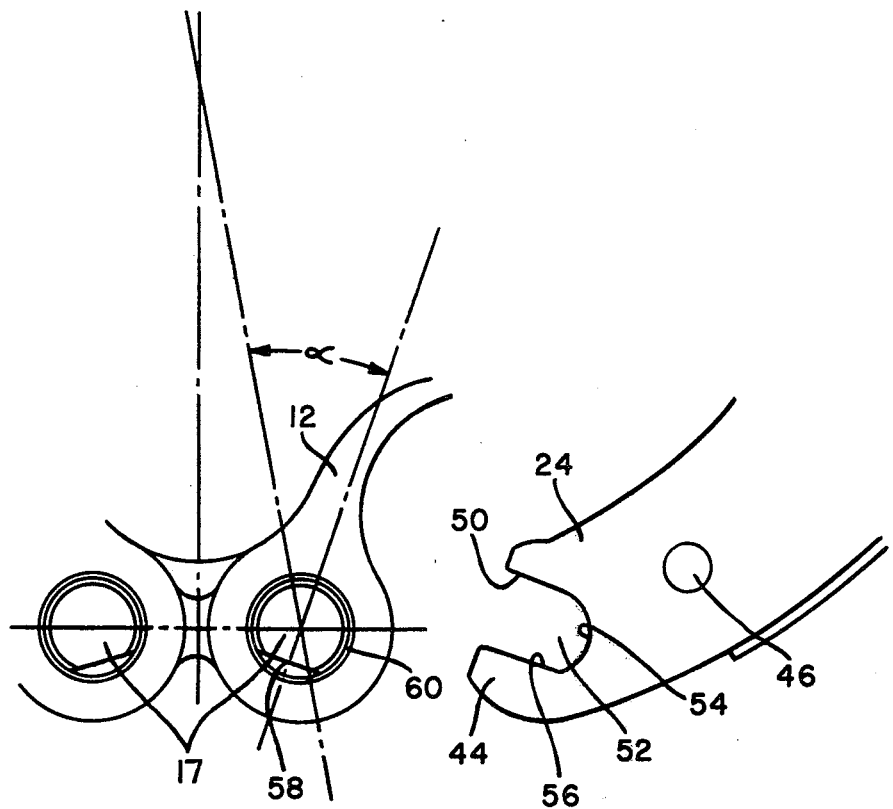
FIG. 4 is a view of the lower part of the brake spider, with one end of the shoes showing an alternate embodiment having a substantially semi-circular shaped aperture.

Referring now to the alternate embodiment of FIG. 4, elements the same or substantially the same as those in the preferred embodiment retain the same reference numerals. In FIG. 4, the aperture 52 is provided with a radial section 54, a flat edge 56 intersecting the radial section 54, and another flat edge 50 which is tangent to the arc defined by the radial section 54. The flat edge 56 is adapted to engage a similar flat edge 58 on modified anchor pin 17 when the brake shoe 14 is installed on the brake spider 12, but since the flat edge 50 is tangent to the arc defined by the section 54, the section 54 can engage the curve section 60 of the anchor pin so that only one flat side 58 is necessary on the anchor pin.

The brake shoes of this invention, through its specific construction and through the construction and function of the anchor pins, offer ease in the assembly and disassembly, and a longer service life for the brake shoes.

Many modifications and/or variations of the present invention are possible by those skilled in the art and it is intended that these modifications and/or variations be included within the scope of the appended claims.

I claim:

1. In a brake, a drum mounted for rotation about an axis with a member to be braked, a support member mounted adjacent said drum, a pair of friction members carried by said support member in end-to-end relationship to present opposite pairs of contiguous ends, said friction members being movable relative to the support member to engage said drum when a brake application is effected, camming means carried by said support member and disposed between one pair of said contiguous ends of said friction members for urging said one pair of contiguous ends apart when a brake application is effected, said support member defining a pair of bores, each of said bores corresponding to a corresponding one of the other pair of contiguous ends of said friction members, a pair of cylindrical anchor pins, one of said anchor pins being rotatably mounted in each of said bores for rotation relative to the support member when a brake application is effected, and coupling means carried by said anchor pins and the other pair of said contiguous ends of said friction member for providing a coupling between said anchor pins and the corresponding one of said other pair of contiguous ends preventing relative rotation between the friction members and the anchor pins wherein said pins are rotated relative to said support member when the friction members are urged into engagement with said drum.

2. The brake as claimed in claim 1, wherein a portion of each of said anchor pins projects from one end of said bore for engagement with the friction members, and said coupling means includes a flattened side on the portions of the anchor pins projecting from said bore and a recess in the contiguous ends of said friction members, said recesses having a substantially flattened edge engaging the flattened side of the anchor pins to thereby prevent relative rotation between each of the anchor pins and its corresponding friction member.

3. The brake as claimed in claim 2, wherein said portions of the anchor pin define parallel flattened sides for engagement with corresponding parallel flattened sides of said recesses, the distance between said parallel flattened sides of the anchor pins being less than the diameter of said anchor pins.

4. The brake as claimed in claims 2 or 3, wherein said bores are defined in a hub carried by the support member, the axis of said bores being parallel to said axis of rotation of said drum, each of said friction members having a friction material carrying portion extending circumferentially with respect to said axis and a radially extending web carried by the friction material carrying portion, said web engaging one end of said hub and carrying said recess coupled to said anchor pins.

5. The brake as claimed in claim 4 wherein each of said friction members has a pair of substantially parallel webs engaging opposite ends of said hub, each of said anchor pins having portions extending from each end of said bores, each of said anchor pin ends having said flattened sides, each of said webs having corresponding recesses having flattened edges engaging a corresponding flattened side of said anchor pins.

6. The brake as claimed in claim 3, wherein an arcuate section of said anchor pin interconnects the parallel flattened sides.

7. The brake as claimed in claim 3, wherein said recess has an arcuate section interconnecting the parallel flattened edges, one of said parallel flattened edges being tangent to the arcuate section, said anchor pins having a single flattened side engaging the other of said flattened edges.

8. The brake as claimed in claim 2 or 3, wherein the angle between a line between said axis of rotation and the center of one of said anchor pins and a line through the center of said one anchor pin perpendicular to said flattened side is in the range from 10° to 40°.

* * * * *